US010585936B2

(12) United States Patent
Kraft et al.

(10) Patent No.: US 10,585,936 B2
(45) Date of Patent: Mar. 10, 2020

(54) GENERATING COMPLEMENTARY COLORS FOR CONTENT TO MEET ACCESSIBILITY REQUIREMENT AND REFLECT TONAL ANALYSIS

(71) Applicant: International Business Machines Corporation, Armonk, NY (US)

(72) Inventors: Maureen Kraft, Hudson, MA (US); Fang Lu, Billerica, MA (US); Charu Pandhi, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 112 days.

(21) Appl. No.: 15/619,889

(22) Filed: Jun. 12, 2017

(65) Prior Publication Data

US 2018/0357231 A1 Dec. 13, 2018

(51) Int. Cl.
*G06F 3/048* (2013.01)
*G06F 16/583* (2019.01)
*G06T 7/90* (2017.01)
*G06F 16/248* (2019.01)
*G06F 16/31* (2019.01)
*G06F 16/2457* (2019.01)
(Continued)

(52) U.S. Cl.
CPC ........ *G06F 16/5838* (2019.01); *G06F 16/248* (2019.01); *G06F 16/24578* (2019.01); *G06F 16/313* (2019.01); *G06F 16/358* (2019.01); *G06T 7/90* (2017.01); *G06T 11/001* (2013.01); *G06T 2207/10024* (2013.01); *G06T 2207/20* (2013.01)

(58) Field of Classification Search
CPC ............. G06F 17/3025; G06F 17/3053; G06F 17/30554; G06F 17/30616; G06T 7/90; G06T 2207/10024
See application file for complete search history.

(56) References Cited

U.S. PATENT DOCUMENTS 5,902,166 A 5/1999 Robb
7,089,504 B1* 8/2006 Froloff ................. G06F 17/241
715/764
7,330,585 B2 2/2008 Rice et al.
(Continued)

OTHER PUBLICATIONS

Anonymous; Contextual Social Content Harmonization, Aug. 17, 2016.
(Continued)

*Primary Examiner* — Anil N Kumar
(74) *Attorney, Agent, or Firm* — Garg Law Firm, PLLC; Rakesh Garg; Brian Welle

(57) ABSTRACT

Textual content is analyzed to determine a tone of the content. A first color palette including a first plurality of colors is computed. The first plurality of colors corresponds to the tone. A first color of the first plurality of colors is selected, and a second color palette including a second plurality of colors is computed. The second plurality of colors corresponds to the first plurality of colors and satisfies a predetermined color-related accessibility requirement between the first selected color and each of the second plurality of colors. A second color of the second plurality of colors is selected, and the content is modified using the first selected color and the second selected color.

16 Claims, 6 Drawing Sheets

(51) Int. Cl.
*G06F 16/35* (2019.01)
*G06T 11/00* (2006.01)

(56) References Cited

U.S. PATENT DOCUMENTS

| | | | |
|---|---|---|---|
| 9,372,933 B2 | 6/2016 | Keohane et al. | |
| 9,519,918 B2 | 12/2016 | Goswami et al. | |
| 10,109,092 B1* | 10/2018 | Hitchings, Jr. | G06T 11/60 |
| 2008/0276163 A1* | 11/2008 | Takagi | G06F 3/16 |
| | | | 715/234 |
| 2013/0097625 A1 | 4/2013 | Thorwirth et al. | |
| 2013/0143185 A1* | 6/2013 | Liu | G09B 19/00 |
| | | | 434/236 |

OTHER PUBLICATIONS

Anonymous; Social Data Analysis as unobtrusive measure for validating human behavior assessment or test (Psychometric) results, Jun. 21, 2011.

Anonymous; A semantic based method and system to perform SQL access path comparison, Jul. 23, 2009.

* cited by examiner

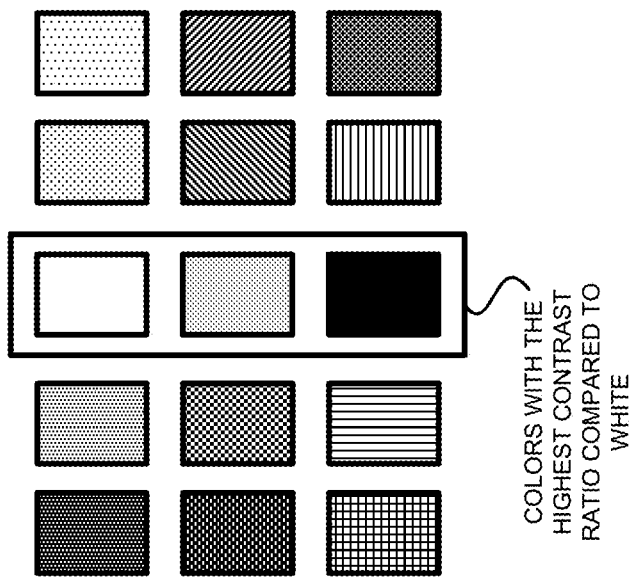

GENERATING COMPLEMENTARY COLORS FOR CONTENT TO MEET ACCESSIBILITY REQUIREMENT AND REFLECT TONAL ANALYSIS

TECHNICAL FIELD

The present invention relates generally to a method, system, and computer program product for selecting complementary colors for authoring content. More particularly, the present invention relates to a method, system, and computer program product for generating complementary colors for content to meet accessibility requirements using tonal cognitive analysis.

BACKGROUND

Designers and authors generate content including textual information when performing tasks such as developing software, mobile and web applications, writing documentation, authoring documents, and generating marketing collateral and help information. These designers and authors tend to select colors that are visually appealing and reflect the design intent of the designer/author without regard to meeting minimum accessibility requirements regarding contrast for foreground and background text. Meeting minimum contrast and other color-related accessibility requirements can be essential for allowing visually impaired persons, such as low vision and aging persons, to access the content. In addition, the designer/author often chooses colors that do not reflect the tone reflected in the message of the text.

SUMMARY

The illustrative embodiments provide a method, system, and computer program product. An embodiment of a method includes analyzing textual content to determine a tone of the content, and computing a first color palette including a first plurality of colors. The first plurality of colors corresponds to the tone. The embodiment includes selecting a first color of the first plurality of colors. The embodiment includes computing a second color palette including a second plurality of colors. The second plurality of colors corresponds to the first plurality of colors and satisfies a predetermined color-related accessibility requirement between the first selected color and each of the second plurality of colors. The embodiment includes selecting a second color of the second plurality of colors, and modifying the content using the first selected color and the second selected color.

Another embodiment further includes wherein the predetermined color-related accessibility requirement includes a predetermined contrast requirement. Another embodiment further includes creating content including the textual content. Another embodiment further includes displaying the first plurality of colors within a graphical user interface.

Another embodiment further includes displaying the second plurality of colors within a graphical user interface. Another embodiment further includes ordering the second plurality of colors in a predetermined order within the graphical user interface. Another embodiment further includes wherein the predetermined order is based upon a user preference. Another embodiment further includes wherein the predetermined order is configured to reduce a cognitive load of a user when viewing the second plurality of colors.

Another embodiment further includes wherein the first selected color is used as a foreground color of the modified content. Another embodiment further includes wherein the second selected color is used as a background color of the modified content.

Another embodiment further includes wherein the tone is associated with an emotion, social tendency, or writing style conveyed by the content. Another embodiment further includes wherein analyzing the content further includes computing a tonal cognitive analysis of the content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIGS. 4A and 4B depict example portions of a graphical user interface in accordance with an illustrative embodiment.

DETAILED DESCRIPTION

Figure 1:
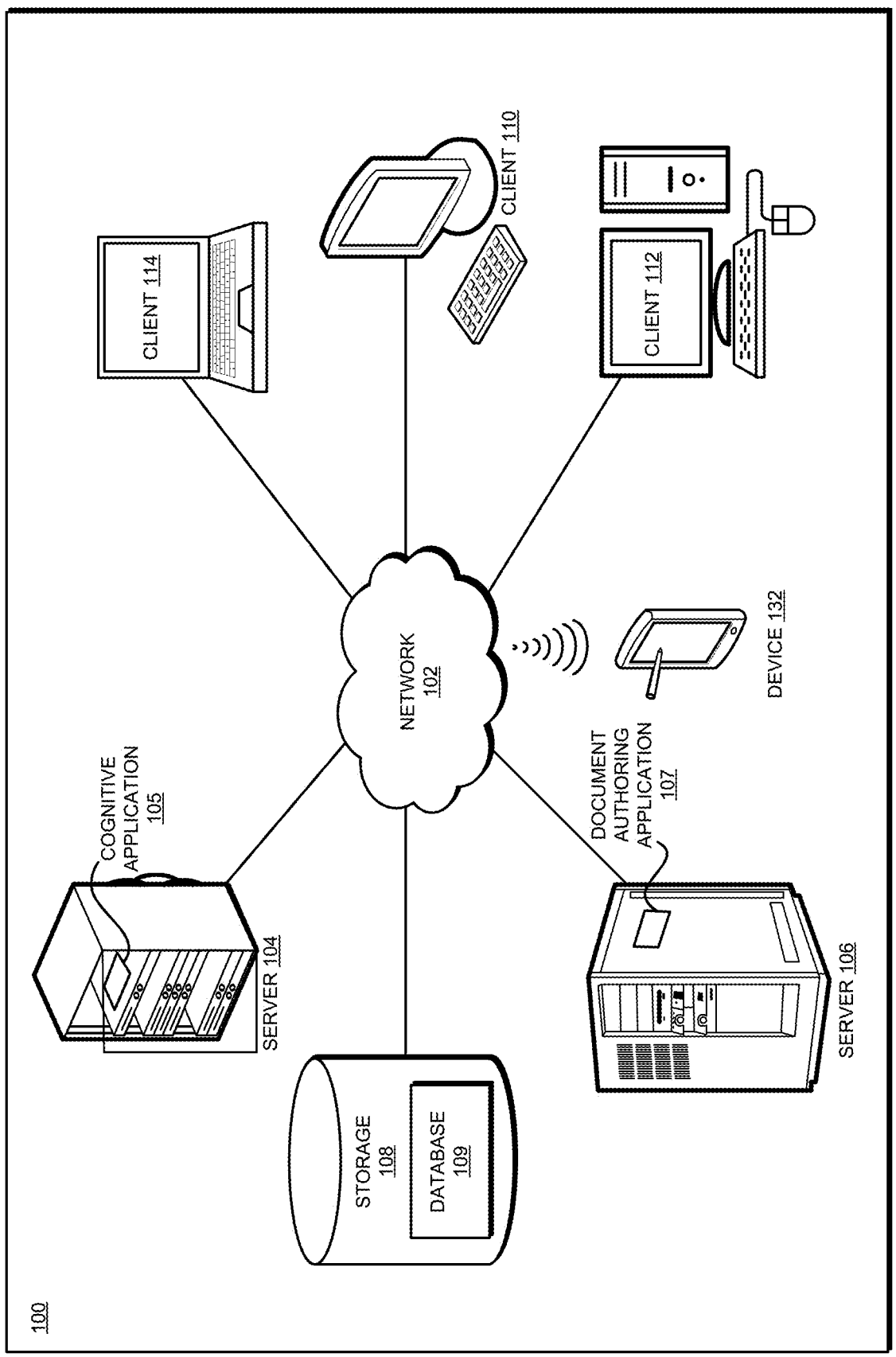
FIG. 1 depicts a block diagram of a network of data processing systems in which illustrative embodiments may be implemented.

The illustrative embodiments described herein generally relate to creating complementary colors for generated content to meet accessibility requirements using tonal cognitive analysis. In accordance with various embodiments, a tone of content including textual information describes an emotion or feeling, social tendency, or writing style perceived by a reader of the content. Examples of tones include, but are not limited to, joy, fear, sadness, anger, disgust, openness, conscientiousness, extraversion, agreeableness, neuroticism, tentative, confident, and analytical.

Existing color analysis tools can check for color contrast minimum requirements but typically do so post-selection and then report a failure if the minimum contrast requirements are not met. Occasionally, these color analysis tools provide a limited set of recommended color schemes that meet minimum contrast requirements.

Furthermore, the colors selected by the designer or author may not reflect the tone of the content text. For example, a black text on a light blue-gray background may be desired to produce soothing text to evoke sympathy by a reader of the particular content. However, the designer/author may have chosen black text on a yellow background which does not convey the emotion intended by the tone of the content.

Various embodiments described herein provide for a cognitive system for selecting complementary colors to represent foreground and/or background colors for content based upon semantic analysis of the content to determine a tone of the content and contrast requirements designed to meet accessibility standards. Complementary colors are colors in a pair which, when placed next to each other, produce the required amount of contrast for those particular colors according to a specification, such as an accessibility standard. In one or more embodiments, a cognitive application analyzes content including textual information by performing a tonal analysis on the content to determine a tone conveyed by the content. In a particular embodiment, the cognitive application uses natural language processing (NLP) to analyze textual content to determine a tone conveyed by the textual content. In an embodiment, the cognitive application uses linguistic analysis to detect communication tones in the written text of the content. In a particular embodiment, the cognitive application uses a cognitive model to perform linguistic analysis of the content to determine the tone of the content.

In an embodiment, an author, designer, or other user generates a document including content using a document authoring application associated with a client device. In particular embodiments, the content includes textual content. In other particular embodiments, the content includes speech content contained in an audio signal that is converted to textual content. In other particular embodiments, the content includes visual data (e.g, image or video data) converted into a textual description of the visual data. In the embodiment, a cognitive application or cognitive system analyzes the content to determine a tone conveyed by the content. In particular embodiments, the cognitive application utilizes natural language processing to determine the tone of the content. In one or more particular embodiments, the cognitive application resides on one or more servers in communication with the client device over a network. In still other particular embodiments, the cognitive application resides on the client device.

In the embodiment, the cognitive application computes a first color palette including a first plurality of colors in which the first plurality of colors corresponds to the tone of the content determined by the cognitive application. The first color palette includes a range of colors that can be displayed on a screen. In the embodiment, one or more of the first plurality of colors of the first color palette are determined to match (within a defined tolerance) the tone of the content as determined by the cognitive application. According to a color theory, particular colors may often be associated with particular emotions. For example, yellow is often associated with happiness and positivity. In another example, blue is often associated with cleanliness and tranquility. In another example, red is often associated with danger or desire. Accordingly, in one or more embodiments, the cognitive application associates each tone determined from content with one or more colors configured to match the tone conveyed by the content.

In the embodiment, the client device displays a portion or all of the first plurality of colors on a display associated with the client device. In the embodiment, the client device provides a graphical user interface in the display in which the graphical user interface is configured to allow the user to select a first color from the first color palette to be used as a foreground color to display the content. In an alternative embodiment, the user selects the first color from the first color palette to be used as a background color to display the content.

In the embodiment, the cognitive application computes a second color palette including a second plurality of colors based upon the first color selection and predetermined contrast requirements. In particular embodiments, the second plurality of colors includes one or more colors that are complementary or near complementary to the selected first color when used as background color for the content when the first color is used as a foreground color for displaying the content. In particular embodiments, the predetermined contrast requirements are minimum contrast requirements between the first color and the second color according to a particular accessibility standard such as a Web Content Accessibility Guidelines (WGAS) 2.0 technical standard. In a particular embodiment, the predetermined contrast requirements require a minimum contrast ratio between the first color and second color of 4.5:1 for normal text and 3:1 for large text.

Although contrast is described in the illustrative embodiments as an example of a color-related accessibility requirement, an embodiment can be adapted for other color-related accessibility requirements, such as selective color-blindness, inability to distinguish shades of certain colors, etc. within the scope of the illustrative embodiments.

In the embodiment, the client device displays the second plurality of colors in the user interface of the display according to a predetermined ordering of the colors. In a particular embodiment, the ordering of the second plurality of colors within the user interface is arranged to reduce a cognitive load, or mental effort, required of the user when viewing the second plurality of colors. In one particular example, the client device displays the second plurality of colors in an ordering in which the color choices are arranged in a left to right ordering in a grid having a range in which the highest contrast ratio color choices are on the left side of the grid and the lowest contrast ratio color choices are on the right side of the grid. In another particular embodiment, the client device displays the second plurality of colors an ordering in which the higher contrast ratio color choices are shown in the center of a grid with lower contrast ratio color choices are shown outside the center of the grid. In other embodiments, the client device displays the second plurality of colors according to a user preference indicated by the user.

In the embodiment, the cognitive application receives a second selection from the user of a second color from among the second plurality of colors of the second color palette via the client device. In the embodiment, the cognitive application generates updated content using the selected first color and the selected second color to represent the foreground color and background color, respectively of the content. In other embodiments, the selected first color may be used as the background color, and the selected second color is used as the foreground color within the content. In the embodiment, the client device displays the updated content within the display of the client device. Accordingly, the cognitive application ensures that one or more of the selected first color or second color match the tone conveyed in the content.

In a particular embodiment, if the tone of the content changes due to the colors chosen by the user, the cognitive application alerts the user of the change and presents the user with new color choices for the first and second colors. In still other particular embodiments, the cognitive application allows the user to override the color choices presented by the cognitive application.

The illustrative embodiments are described with respect to certain types of cognitive processes, color palettes, user interfaces, accessibility requirements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
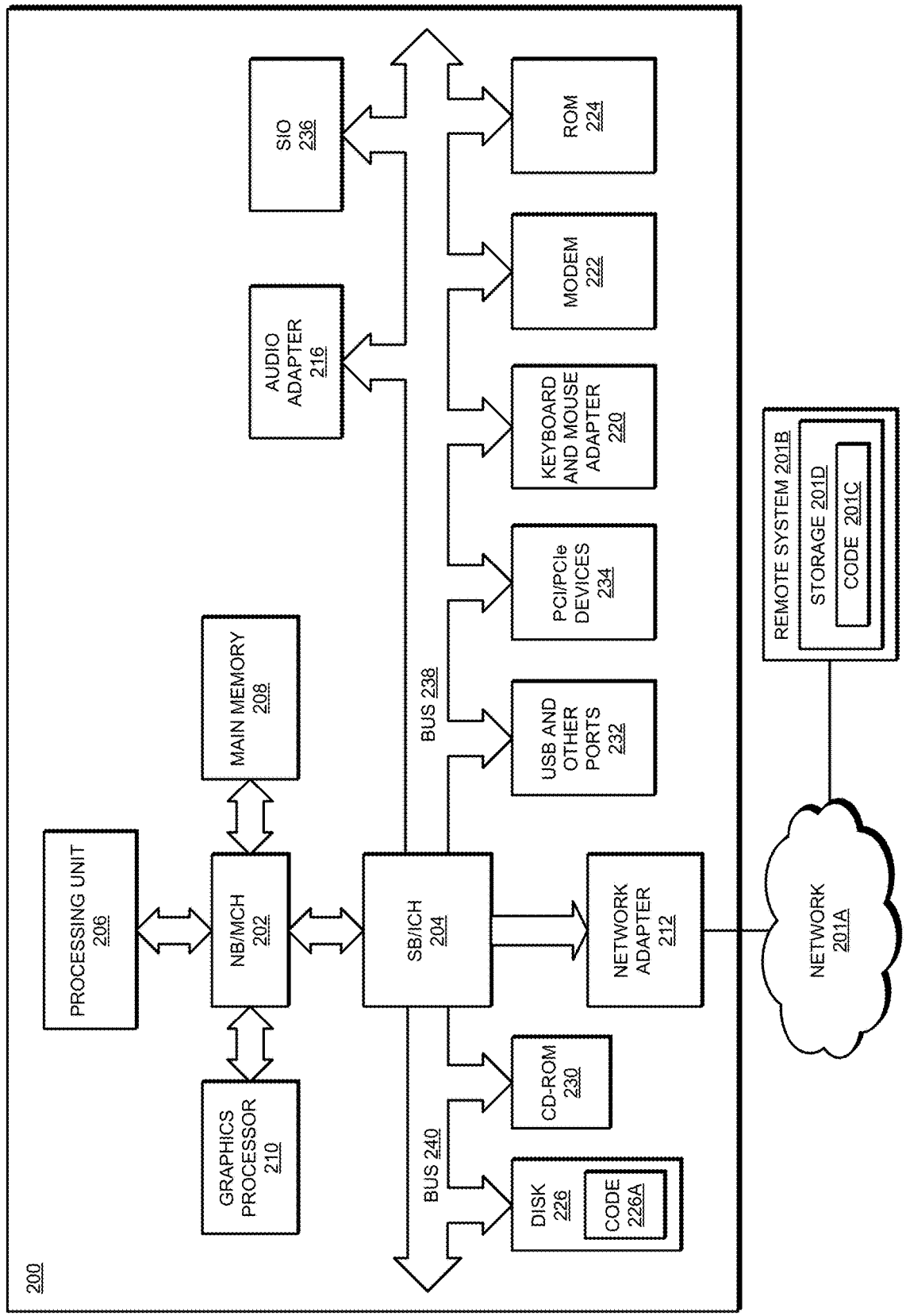
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store tonal analysis models, color palette information, user preferences, and/or user generated content within a database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a PDA, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Cognitive application 105 of server 104 implements an embodiment of an algorithm for computing a tone of content using cognitive tonal analysis in a network environment as described herein. Document authoring application 107 of server 106 implements document authoring processes allowing a user to generate content having textual information conveying a particular tone as described herein with respect to various embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as cognitive application 105 and document authoring application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
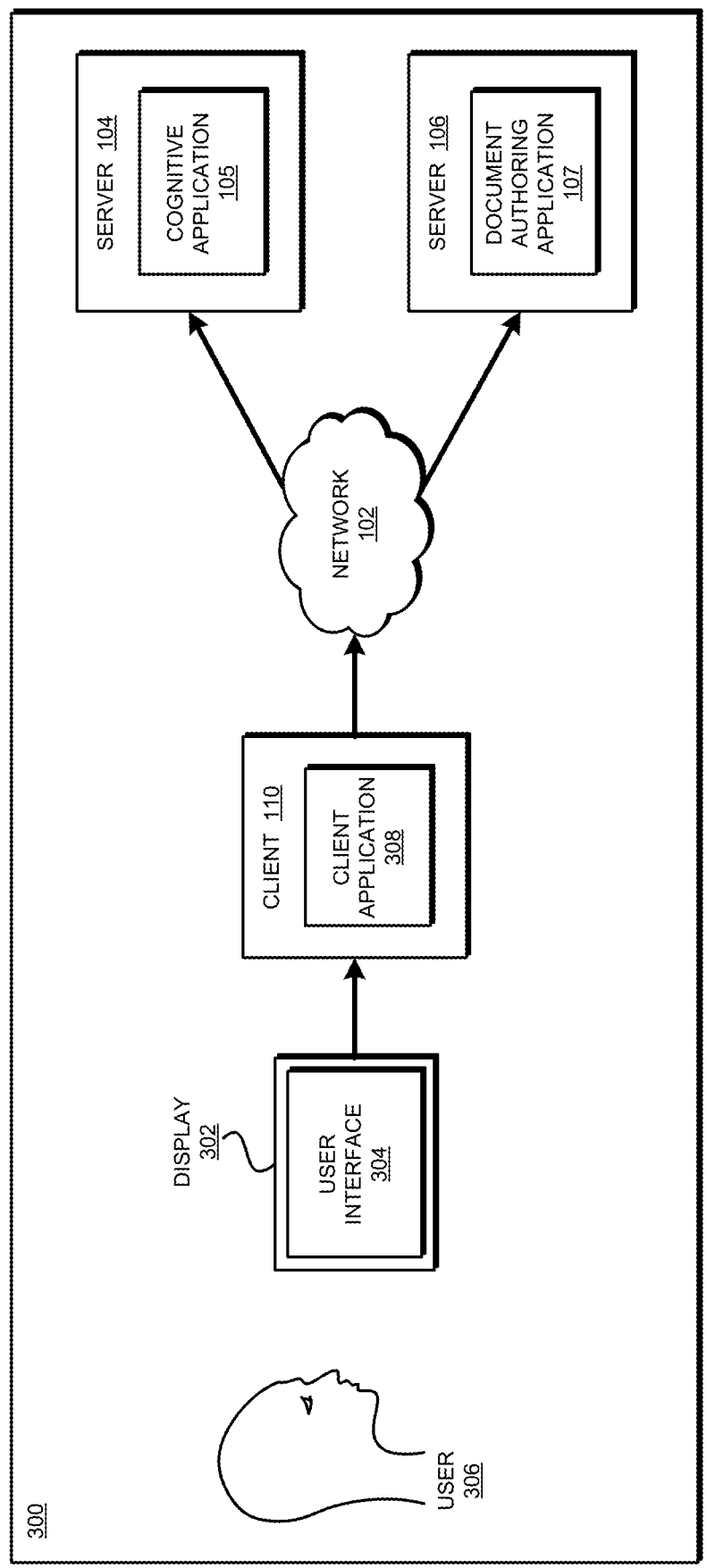
FIG. 3 depicts a block diagram of a network for generating complementary colors for content to meet accessibility requirements using tonal cognitive analysis in which illustrative embodiments may be implemented.

With respect to FIG. 3, this figure depicts a block diagram of a network for generating complementary colors for content to meet accessibility requirements using tonal cognitive analysis in which illustrative embodiments may be implemented. Network environment 300 is a network of computers in which the illustrative embodiments may be implemented. Network environment 300 includes network 102, server 104, cognitive application 105, server 106, document authoring application 107, and client 110 which are previously described with respect to FIG. 1. Client 110 has an associated display 302 including a user interface 304 allowing a user 306 to interact with client 110. Network 102 is the medium used to provide communications links between various devices and computers connected together within network environment 300.

Cognitive application 105 of server 104 implements an embodiment of a cognitive application for generating complementary colors for content to meet accessibility requirements using tonal cognitive analysis in a network environment as described herein. Document authoring application 107 implements one or more content creating and/or editing processes as described herein with respect to various embodiments.

In an embodiment, user 306 generates a document including content using document authoring application 107 of server 106. In particular embodiments, the content includes textual, speech, or visual content. In the embodiment, cognitive application 105 of server 104 analyses the content to determine a tone conveyed by the content. In particular embodiments, cognitive application 105 utilizes natural language processing to determine the tone of the content.

In the embodiment, cognitive application 105 computes a first color palette including a first plurality of colors in which the first plurality of colors is based upon the tone of the content determined by cognitive application 105.

In the embodiment, client device 110 displays a portion or all of the first plurality of colors on 302 display associated with client device 110 within graphical user interface 304. In the embodiment, the user selects a first color from the first color palette to be used as a foreground color to display the content. In an alternative embodiment, the user select the first color from the first color palette to be used as a background color to display the content.

In the embodiment, cognitive application 105 computes a second color palette including a second plurality of colors based upon the first color selection and predetermined contrast requirements. In one or more embodiments, the second plurality of colors are complementary to the selected first color when used as a background color for the content when the first color is used as a foreground color for displaying the content. In particular embodiments, the predetermined contrast requirements are minimum contrast requirements between the first color and the second color according to a particular accessibility standard.

In the embodiment, client device 110 displays the second plurality of colors in graphical user interface 304 of display 302 according to a predetermined ordering of the colors. In a particular embodiment, the ordering of the second plurality of colors within graphical user interface 304 is arranged to reduce a cognitive load of user 306 when viewing the second plurality of colors. In one particular example, client device 110 displays the second plurality of colors in an ordering in which the color choices are arranged in a left to right ordering in a grid having a range in which the highest contrast ratio color choices are on the left side of the grid and the lowest contrast ratio color choices are on the right side of the grid. In another particular embodiment, client device 110 displays the second plurality of colors an ordering in which the higher contrast ratio color choices are shown in the center of a grid with lower contrast ratio color choices are shown outside the center of the grid. In other embodiments, client device 110 displays the second plurality of colors according to a user preference indicated by user 306.

In the embodiment, cognitive application 105 receives a second selection from the user of a second color from among the second plurality of colors of the second color palette via client device 110. In the embodiment, cognitive application 105 generates updated content using the selected first color and the selected second color to represent the foreground color and background color, respectively of the content. In other embodiments, the selected first color may be used as the background color, and the selected second color is used as the foreground color within the content. In the embodiment, client device 110 displays the updated content within display 302 of client device 110. Accordingly, in one or more embodiments, one or more of the selected first color or selected second color match the tone conveyed in the content.

Among other uses, network environment 300 may be used for implementing a client-server environment in which the illustrative embodiments may be implemented. A client-server environment enables software applications and data to be distributed across a network such that an application functions by using the interactivity between a client data processing system and a server data processing system. Network environment 300 may also employ a service oriented architecture where interoperable software components distributed across a network may be packaged together as coherent business applications. Network environment 300 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 4A:
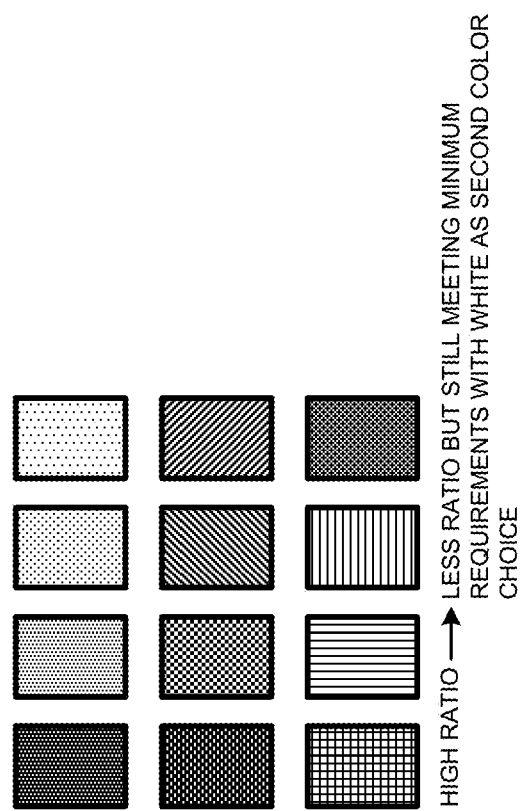

With respect to FIGS. 4A and 4B, these figures depict example portions of a graphical user interface in accordance with an illustrative embodiment. In the examples of FIGS. 4A and 4B, a graphical user interface shows a grid of color choices for a second color palette meeting particular contrast requirements between a first color selection matching the tone of the content and color choices for a second color in which one or more of the second colors meet the particular contrast requirements. In the example of FIG. 4A, the colors of the second color palette are arranged in a grid pattern in which higher contrast ratio color choices are shown in a left portion of the grid and lower contrast color choices are shown in a right portion of the grid. In the example of FIG. 4B, the colors of the second color palette are arranged in a grid pattern in which colors with the highest contrast ratio are shown in a middle portion of the grid. It should be understood that FIGS. 4A and 4B provide particular examples of a graphical user interface for presenting color choices within a color palette to a user. In other embodiments, other arrangements for presenting color choices within a color palette may be used such as within a color wheel, a color gradient, one or more columns of colors, one or more rows of colors or any other desired ordering of color choices.

Figure 5:
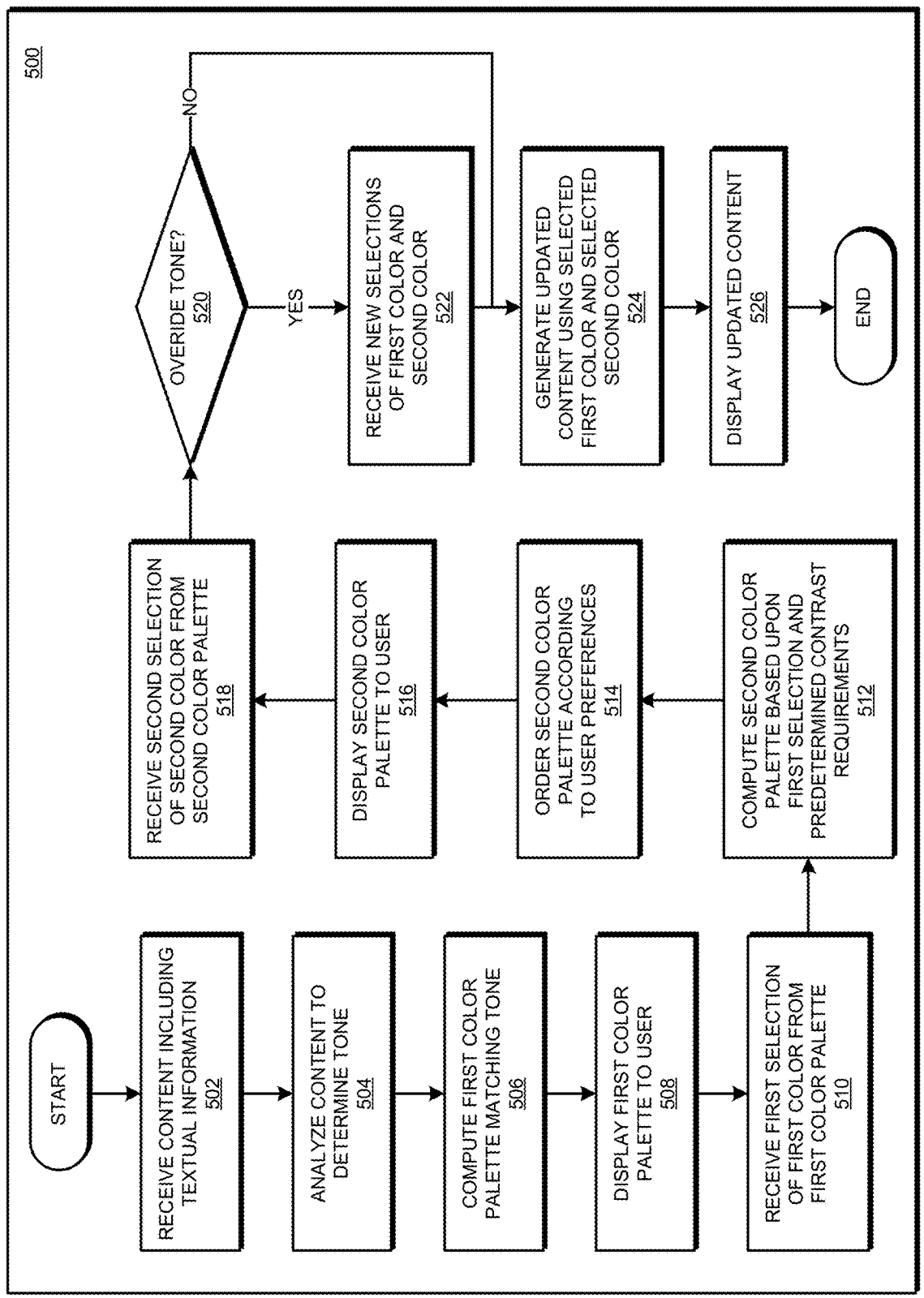
FIG. 5 depicts a flowchart of an example process for generating complementary colors for content to meet accessibility requirements using tonal cognitive analysis in accordance with an illustrative embodiment.

With reference to FIG. 5, this figure depicts a flowchart of an example process for generating complementary colors for content to meet accessibility requirements using tonal cognitive analysis in which illustrative embodiments may be implemented in a network environment in accordance with an illustrative embodiment. In one or more embodiments, process 500 can be implemented in cognitive application 105. In other embodiments, process 500 can be implemented in client device 110.

In block 502, cognitive application 105 receives content including textual information. In particular embodiments, the content is generated by a user using document authoring application 107. In still other particular embodiments, the content is generated by a user using client device 110. In block 504, cognitive application 105 analyzes the content to determine a tone of the content using a tonal analysis process.

In block 506, cognitive application 105 computes a first color palette based upon the determined tone of the content. In an embodiment, the first color palette includes a first plurality of colors in which at least a portion of the plurality of colors matches the tone of the content. In block 508, the cognitive application 105 displays a portion or all of the first plurality of colors of the first color palette to the user associated with client 110. In one or more embodiments, the cognitive application displays the first plurality of colors to the user using a predetermined ordering of the first plurality of colors.

In block 510, cognitive application 105 receives a first selection of a first color from among the plurality of users. In block 512, cognitive application 105 computes a second color palette including a second plurality of colors based upon the first selection of the first color and predetermined contrast requirements between the first color and each of the second plurality of colors. In particular embodiments, a portion or all of the second plurality of colors of the second color palette are complementary colors to the selected first color according to a particular color theory. In a particular embodiment, the complementary colors are colors that are pleasing when used in combination with one another. In the embodiment, a portion or all of the colors of the second plurality of colors are generated to meet the predetermined contrast requirements.

In block 514, cognitive application orders the second plurality of colors of the second color palette according to one or more user preferences. In a particular embodiment, the user preference indicates that the second plurality of colors are arranged such that higher contrast ratio colors are shown in a left side of a grid, and lower contrast ratio colors are shown in a right side of the grid. In another particular embodiment, the user preference indicates that the second plurality of colors are arranged such that higher contrast ratio colors are shown in a middle portion of a grid, and lower contrast ratio colors are shown at edges of the grid. In another particular embodiment, the second plurality of colors are arranged such that they reduce cognitive load on the user based on eye tracking data which demonstrates where the user looks for the higher contrast ratio colors first.

In block 516, cognitive application 105 displays the second plurality of colors of the second color palette in the determined order. In block 518, cognitive application 105 receives a second selection of a second color from the plurality of colors of the second color palette from the user. In block 520, cognitive application 105 determines whether the user wishes to override the tone of the content. If the user wishes to override the tone of the content, in block 522 cognitive application 105 receives new selections of the first color and the second color from the user, in which the new selections do not necessarily conform to the determined tone of the content. The process 500 continues to block 524. If the user does not wish to override the tone of the content, the process continues to block 524.

In block 524, cognitive application 105 generates updated content using the selected first color and the selected second color. In a particular embodiment, the selected first color is used as a foreground color in the updated content, and the selected second color is used as a background color in the updated content. In another particular embodiment, the selected first color is used as a background color in the updated content, and the selected second color is used as a foreground color in the updated content. In one or more embodiments, the updated content includes the original content formatted to include one or more of a background color and a foreground color matching the determined tone of the content. In block 526, cognitive application 105 displays the updated content in the display 302 of client device 110. Process 500 is ended thereafter.

Thus, a computer implemented method, system or apparatus, and computer program product are provided in the illustrative embodiments for generating complementary colors for content to meet accessibility requirements using tonal cognitive analysis in a network environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

analyzing textual content to determine a tone of the content;

computing a first color palette including a first plurality of colors, the first plurality of colors corresponding to the tone;

selecting a first color of the first plurality of colors;

computing a second color palette including a second plurality of colors, the second plurality of colors corresponding to the first plurality of colors and satisfying a predetermined color-related accessibility requirement between the first selected color and each of the second plurality of colors;

displaying the second plurality of colors within a graphical user interface;

ordering the second plurality of colors in a predetermined order within the graphical user interface, wherein the predetermined order is based upon a user preference;

selecting a second color of the second plurality of colors, wherein a contrast ratio is a part of the color-related accessibility requirement, and wherein the contrast ratio is between the first color and the second color is at least 3:1;

overriding, in response to a user request to change the tone of the content, the first selected color and the second selected color with a new selection for the first color and a new selection for the second color; and modifying the content using the first selected color and the second selected color.

2. The method of claim 1, wherein the predetermined color-related accessibility requirement includes a predetermined contrast requirement.

3. The method of claim 1, further comprising:

creating content including the textual content.

4. The method of claim 1, further comprising displaying the first plurality of colors within a graphical user interface.

5. The method of claim 1, wherein the predetermined order is configured to reduce a cognitive load of a user when viewing the second plurality of colors.

6. The method of claim 1, wherein the first selected color is used as a foreground color of the modified content.

7. The method of claim 1, wherein the second selected color is used as a background color of the modified content.

8. The method of claim 1, wherein the tone is associated with an emotion, social tendency, or writing style conveyed by the content.

9. The method of claim 1, wherein analyzing the content further includes computing a tonal cognitive analysis of the content.

10. A computer usable program product comprising one or more computer-readable storage devices, and program instructions stored on at least one of the one or more storage devices, the stored program instructions comprising:

program instructions to analyze textual content to determine a tone of the content;

program instructions to compute a first color palette including a first plurality of colors, the first plurality of colors corresponding to the tone;

program instructions to select a first color of the first plurality of colors;

program instructions to compute a second color palette including a second plurality of colors, the second plurality of colors corresponding to the first plurality of colors and satisfying a predetermined color-related accessibility requirement between the first selected color and each of the second plurality of colors;

program instructions to display the second plurality of colors within a graphical user interface;

program instructions to order the second plurality of colors in a predetermined order within the graphical user interface, wherein the predetermined order is based upon a user preference;

program instructions to select a second color of the second plurality of colors, wherein a contrast ratio is a part of the color-related accessibility requirement, and wherein the contrast ratio is between the first color and the second color is at least 3:1;

program instructions to override, in response to a user request to change the tone of the content, the first selected color and the second selected color with a new selection for the first color and a new selection for the second color; and program instructions to modify the content using the first selected color and the second selected color.

11. The computer usable program product of claim 10, wherein the predetermined color-related accessibility requirement includes a predetermined contrast requirement.

12. The computer usable program product of claim 10, further comprising:

program instructions to create content including the textual content.

13. The computer usable program product of claim 10, further comprising displaying the first plurality of colors within a graphical user interface.

14. The computer usable program product of claim 10, wherein the computer usable code is stored in a computer readable storage device in a data processing system, and wherein the computer usable code is transferred over a network from a remote data processing system.

15. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze textual content to determine a tone of the content;

program instructions to compute a first color palette including a first plurality of colors, the first plurality of colors corresponding to the tone;

program instructions to select a first color of the first plurality of colors;

program instructions to compute a second color palette including a second plurality of colors, the second plurality of colors corresponding to the first plurality of colors and satisfying a predetermined color-related accessibility requirement between the first selected color and each of the second plurality of colors;

program instructions to display the second plurality of colors within a graphical user interface;

program instructions to order the second plurality of colors in a predetermined order within the graphical user interface, wherein the predetermined order is based upon a user preference;

program instructions to select a second color of the second plurality of colors, wherein a contrast ratio is a part of the color-related accessibility requirement, and wherein the contrast ratio is between the first color and the second color is at least 3:1;

program instructions to override, in response to a user request to change the tone of the content, the first selected color and the second selected color with a new selection for the first color and a new selection for the second color; and program instructions to modify the content using the first selected color and the second selected color.

* * * * *